(12) United States Patent
Mitsch

(10) Patent No.: US 9,714,701 B2
(45) Date of Patent: Jul. 25, 2017

(54) ELASTIC BUSHING FOR PLANETARY BEARINGS

(71) Applicant: FM ENERGIE GMBH & CO. KG, Heppenheim (DE)

(72) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 0 days.

(21) Appl. No.: 15/029,026

(22) PCT Filed: Oct. 13, 2014

(86) PCT No.: PCT/EP2014/002754
§ 371 (c)(1),
(2) Date: Apr. 13, 2016

(87) PCT Pub. No.: WO2015/055291
PCT Pub. Date: Apr. 23, 2015

(65) Prior Publication Data
US 2016/0245390 A1    Aug. 25, 2016

(30) Foreign Application Priority Data

Oct. 15, 2013   (EP) ...................................... 13004936

(51) Int. Cl.
*F16H 57/08*    (2006.01)
*F16H 57/00*    (2012.01)
(Continued)

(52) U.S. Cl.
CPC ......... *F16H 57/0006* (2013.01); *F03D 80/70* (2016.05); *F16F 1/38* (2013.01);
(Continued)

(58) Field of Classification Search
None
See application file for complete search history.

(56) References Cited

U.S. PATENT DOCUMENTS 4,090,416 A *  5/1978  Hicks ...................... F16D 3/185
                                                      475/317
6,848,828 B2 *  2/2005  Nishijima ............. B05B 5/0415
                                                      384/103
(Continued)

FOREIGN PATENT DOCUMENTS

| EP | 2 354 544 A1 | 8/2011 |
| WO | 2009/121552 A1 | 10/2009 |
| WO | 2012/119748 A1 | 9/2012 |

OTHER PUBLICATIONS

International Search Report Corresponding to PCT/EP2014/002754 mailed Feb. 16, 2015.
(Continued)

*Primary Examiner* — Dirk Wright
(74) *Attorney, Agent, or Firm* — Davis & Bujold PLLC; Michael J. Bujold

(57) ABSTRACT

An elastic bushing which has novel damping by corresponding design measures and devices in order to eliminate, or greatly reduce, undesired vibrations in planetary bearings, particularly for planet gears for planetary gearboxes. This invention also relates, in particular, to the use of bushings, planet gears or planetary gearboxes of this type in machine parts and installations which transmit only low or no moments such, for example, wind turbines.

18 Claims, 7 Drawing Sheets

Figure 1:
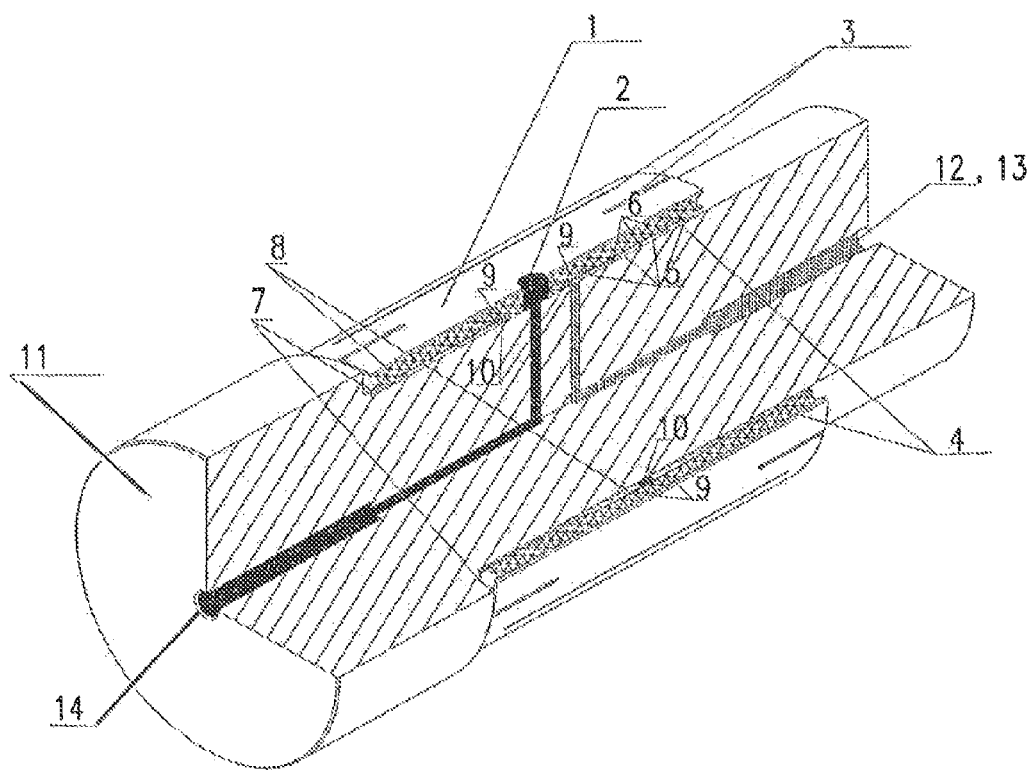

(51) Int. Cl.
| | |
|---|---|
| *F16F 1/38* | (2006.01) |
| *F16H 57/04* | (2010.01) |
| *F03D 80/70* | (2016.01) |
| *F16F 15/12* | (2006.01) |
| *F16H 57/028* | (2012.01) |

(52) U.S. Cl.
CPC ....... *F16F 15/1201* (2013.01); *F16H 57/028* (2013.01); *F16H 57/0479* (2013.01); *F16H 57/0482* (2013.01); *F16H 57/082* (2013.01); *F05B 2220/30* (2013.01); *F05B 2260/964* (2013.01); *F05B 2260/98* (2013.01); *F16F 2228/08* (2013.01); *F16F 2230/04* (2013.01); *F16F 2232/02* (2013.01); *F16H 2057/085* (2013.01)

(56) References Cited

U.S. PATENT DOCUMENTS

| | | | |
|---|---|---|---|
| 9,109,628 B2* | 8/2015 | Sieveking | ........... F16C 33/1085 |
| 9,194,450 B2 | 11/2015 | Mitsch | |
| 9,284,975 B2 | 3/2016 | Mitsch | |
| 2011/0140448 A1 | 6/2011 | Takeuchi et al. | |
| 2016/0010686 A1* | 1/2016 | Cordts | .................... F16F 13/20 |
| | | | 384/103 |

OTHER PUBLICATIONS

Written Opinion Corresponding to PCT/EP2014/002754 mailed Feb. 16, 2015.

* cited by examiner

ELASTIC BUSHING FOR PLANETARY BEARINGS

The invention relates to a pretensionable elastic bushing which has novel damping through corresponding design measures and devices in order to eliminate or reduce undesired vibrations in planetary bearings, in particular planet gears for planetary gearboxes. The invention also relates, in particular, to the use of bushings, planet gears or planetary gearboxes of this type in machine parts and installations which transmit only low or no moments, for example in wind turbines.

In a planetary gearbox, a number of planet gears (generally 3-4) run within an annular gear and roll against the teeth of the annular gear. These in turn drive the so-called "sun". This enables relatively high transmission to be achieved.

On application of the drive moment, the front disc of the planet carrier generally twists with respect to the rear disc thereof. This causes the axle of the planets to tilt. Further tilting of the axle may occur due to the introduction of bending moments via the input shaft and the connection to the input shaft.

Due to this tilting of the planet carrier or planetary gearbox, an unequal load distribution takes place over the length of the planet gearwheels. In order to prevent unequal carrying of the teeth, it is necessary to provide the planets with elastic bearings on their axles in the cardanic direction. The bearing arrangement must be homogeneous at the perimeter of the planetary bearing.

In the bearing arrangement which is cardanically softer in the ideal case, the planets align at the annular gear and at the sun in such a way that tilting of the teeth does not take place. It is furthermore desirable for the planets to be mountable within the planet carrier, which generally consists of one part. At the same time, the planetary roller bearings should or must be lubricated from the inside through a hole present in the shaft in order that continuous operation of the planetary bearing is ensured.

The conventional planet gears, planetary bearings and planetary gearboxes have no or only conventional damping devices, so that all said loads must be absorbed and borne by the individual parts of the gears, bearings and gearboxes.

The object of the invention now consists in providing the planet gears with special elastic bearings, so that the problems described no longer occur or at least only do so to a lesser extent.

The object has been achieved by the pretensionable bushing according to the invention, as described below and in the closer claims.

The invention relates to a pretensionable elastic cylindrical bushing for the absorption of vibrations of a wheel bearing or planetary bearing (17) which are essentially transmitted to the bushing via at least one axially arranged shaft or drive axle (11) which is passed through the eye of the bushing, where the bushing essentially includes the following features:
(i) an outer cylindrical body (8) and an inner cylindrical body (7), both of which are connected to one another by an elastic layer (4) and represent the bushing body (1),
(ii) slots (3) in the outer and inner cylinders, which are arranged axially in the longitudinal direction distributed over their surfaces,
(iii) at least one displacement space (9) inside the inner and outer cylinders, which is formed by the elastic layer (4) not being connected to the corresponding inside wall of the cylinders (7) (8) at some points, but instead being in only loose contact, and
(iv) a hard or elastic, preferably elastic layer (5), which is installed on the inward-facing wall of the inner cylinder (7) of the bushing, and is provided with channels and/or cavities which form at least one bypass space (10) between the inner cylinder (7) and the shaft or axle (11) connected to the bushing, where this bypass space is connected to a said displacement space (9) and lines (12) through which a pressure medium (13) can be transported to the at least one bypass space (10) and from there to the at least one displacement space (9) with the aid of corresponding mechanical or hydraulic devices, so that the elastic layer (4) is compressed, which in turn results in expansion of the bushing (1) itself, which is facilitated or at least made easier by the said slots (3).

The invention thus relates to a pretensionable elastic cylindrical bushing, through the eye of which a shaft or axle (11) for the absorption of vibrations of a wheel bearing or planetary bearing (17) is intended to pass, comprising
(i) a non-elastic outer cylinder (8) and a non-elastic inner cylinder (7), both of which are connected to one another by an elastic layer (4) and form the bushing body (1) with the latter,
(ii) slots (3) in the outer and/or inner wall bodies, which are arranged axially in the longitudinal direction distributed over the surfaces,
(iii) at least one displacement space (9) in the elastic layer (4) in the space between the inner and outer cylinders (7) (8), which is formed by the elastic layer (4) having slot-like pockets in certain regions, or not being connected to the corresponding inside wall of the cylinder (7) or (8) or of an intermediate plate or intermediate cylinder (26), but instead being in only loose contact, so that it is forced away from the wall on use of pressure media in this region and results in an increase in the volume of the said displacement space in the layer, and
(iv) at least one bypass space (10), which arises through a separation, to be maintained by corresponding media, between the inner cylinder (7) and the shaft or axle (11) to be passed through the inner cylinder (7), where the bypass space (10) outside the bushing is connected to the displacement space (9) inside the bushing via at least one connecting opening (25) in the wall of the inner cylinder (7) and is supplied, by means of one or more lines (12), with a pressure medium (13), which is pressed from of the bypass space into the displacement space (9), so that the elastic layer in the interior of the bushing is compressed and the bushing is expanded over its entire perimeter owing to the slots (3) present, generating uniform rotationally symmetrical pretensioning of the bushing.

The at least one displacement space (9) is preferably arranged at the interface between inner cylinder (7) and/or outer cylinder (8), and/or, if present, at a central plate (26) between two elastic layers (4). In an embodiment of the invention, the displacement space (9) is arranged between the elastic layer (4) and the inside wall of the inner cylindrical body (7). However, it can also be arranged inside an elastic layer (4). In this case, elastic layers which are separated in a certain region must be present, or alternatively the elastic layer must have slot-like pockets.

In accordance with the invention, the bypass space (10) is formed by a preferably elastic spacer sleeve (5), which is pushed into the inner cylinder (7) with an accurate fit and is itself intended for accommodation of the shaft or axle (11) with a close fit. In certain zones, the sleeve (5) has channels, cut-outs or cavities which have connections (25) to the said displacement spaces (9). The sleeve (5) with its openings can thus also be regarded as support between bushing and shaft/axle.

In an embodiment of the invention, the layer or spacer sleeve (5) with its channels, cut-outs and cavities is an integral constituent of the bushing (1) and wraps tightly around the inside wall of the inner cylinder (7).

In an alternative embodiment of the invention, the layer or spacer sleeve (5) with the channels and/or cavities is an integral constituent of the shaft or axle (11) and wraps around the axle or shaft in the region of the bushing.

The invention thus also relates to a pretensionable elastic cylindrical bushing which has or includes the following features: (i) an outer cylindrical body (8) and an inner cylindrical body (7), both of which are connected to one another by an elastic layer (4), (ii) slots (3) in the outer and inner wall bodies, which are arranged axially in the longitudinal direction distributed over the surfaces, (iii) at least one displacement space (9) inside the bushing body, and (iv) and axle or shaft (11), passed through the eye of the bushing, which has, in the region of the bushing, a preferably elastic spacer layer or spacer sleeve (5), which is provided with channels and/or cavities which are open facing the inside wall (7) of the bushing, resulting in the formation of at least one bypass space (10) between bushing body and shaft/axle in certain regions.

If a plurality of bypass spaces (10) are present, these may in accordance with the invention be connected to one another by annular channels (27).

In all cases, the bypass space (10) is connected to the displacement space (9) via connecting openings (25) in the wall of the inner cylinder and optionally connecting lines and is supplied via lines (12) with a pressure medium (13), which is pressed from the bypass space (10) into the displacement space (9) via said openings (25), so that the elastic layer(s) (4) is (are) compressed, and the bushing is expanded over its entire perimeter owing to the slots (3) present, generating uniform rotationally symmetrical pretensioning of the bushing.

In a particular embodiment, the openings (25) are not provided separately, but are provided by at least some of the slots (3) present which take on their function.

The lines (12) may be, for example, holes or sleeves in corresponding holes which are preferably arranged axially/radially in the interior of the shaft or axle (11). However, they may also be provided outside the shaft/axle.

In a further embodiment, the bushings according to the invention have at least one hole (19) transversely through the bushing body or radially thereto, i.e. also through the elastomer layer (4), and thus represents a connection to the constituents (e.g. gear rings) of the planetary gearbox which are arranged externally around the bushing. Lubricant (18) for the gears of the gearbox, which is intended to be provided primarily via corresponding holes (2, 14) in the axle or shaft (11), can be supplied via an opening (19) of this type. These openings (19) can be omitted if lubrication of the said planet parts from the outside is facilitated. Sleeves can of course also be used in the holes (2, 14) and (19) here, which has advantages with respect to the tightness required. When sizing the radial hole (19), it should be ensured that its diameter is sufficiently large that the hole is not closed by expansion of the displacement space (9) on compression of the elastic layer (4).

The bushings according to the invention may also have a plurality of elastomer layers (4) which are connected to one another by separating walls/separating plates (26). Suitable bushings here are, in particular, those which have one or two separating plates (26) having two or three elastic layers (4). It is also possible here for the displacement space (9) to be arranged not only between inner plate/inner cylinder (7) and the adjacent elastomer layer (4), but also alternatively, but preferably additionally, in a selected region between a separating plate or separating cylinder (26) and the elastic layer (4) located above or below. In the case of relatively large and thick bushings, easier and more uniform pretensioning can thus be achieved.

The pretensionable elastic bushing according to the invention may in accordance with the invention also is composed of half-shells or quarter-shells.

The invention furthermore relates to a planetary bearing which comprises a planet carrier (15) (20) (21) (22) and a planet gearwheel crown (16), mounted, for example, on ball bearings, and has an elastic bushing according to the invention, as described, in one or all planet gears present or optionally also the sun.

The invention furthermore relates to the use of an elastic bushing, planetary bearing or planetary gearbox according to the invention in machines and installations which have shaft-hub connections and transmit no or only low moments, in particular in installations having moment bearings arranged one behind the other.

Finally, the invention relates to the use of an elastic bushing, planetary bearing or planetary gearbox according to the invention, as described, for use in wind turbines.

Figure 2:
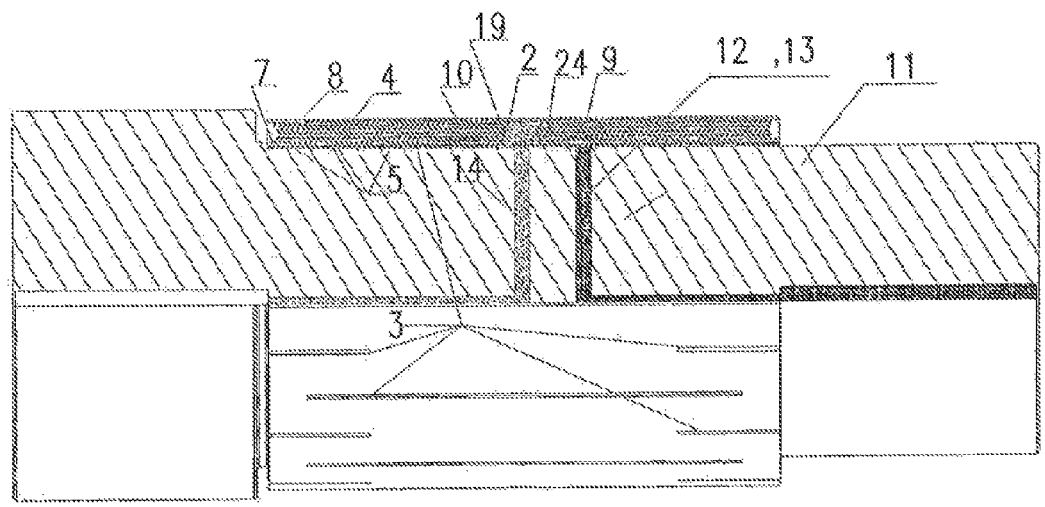

The bushing according to the invention consists, as already described, essentially of an inner plate (7) and an outer plate (8), which are separated from one another and connected to one another by an elastic layer. Such bushings are known per se. It is novel here that the outer plates and also the inner plates preferably has overlapping axially directed longitudinal slots (3). This makes it possible for the plates to expand homogeneously over the perimeter. The slots may be arranged as depicted in FIG. 2. However, they may also overlap to a greater extent and consist of a plurality of individual slots over the length, so that even more homogeneous expansion of the bushing through elastomeric sealing than depicted can take place. Alternatively, it is also possible to make the plates deformable by means of a radially expandable fabric or mesh, although this is technically very complex.

In the case of the elastic bushings known in the prior art, which are designed predominantly as half-shells and are intended to be employed for damping purposes, it is not intended to make the outer and inner plates soft and deformable and expandable in the radial direction, since this would not meet the other technical requirements described. In the case of these known variants, the change in length can thus only take place at the joints of the two half-shells, with homogeneous deformation over the perimeter not being ensured.

This is no longer the case in the bushings according to the invention. The inner and outer plates (7) (8) of a bushing of this type may consist of a piece (welded) or a roiled plate having a joint, or also of two half-shells, optionally also of four quarter-shells. The elastomer layer (4) is arranged between the two plates. This penetrates through the slots (3) of the two plates. This is advantageous for manufacturing reasons, even if the gaps/slots do not have to be sealed with elastomer.

A further novel feature is that the inner plate or the inner bushing (7) has a coating or layer in the form of a sleeve (5), which is connected on the one hand to the inside wall of the inner bushing and on the other hand to the shaft or axle (11). This coating/layer (5) has, in accordance with the invention, channels and/or cavities which form a bypass space (10) between bushing and axle/shaft which is intended for a pressure medium (13). The coating/layer (5) is preferably firmly connected to the bushing wall (7) facing the axle (11). However, it is in principle also possible for this layer (5) to be firmly connected to the corresponding region of the axle/shaft (11), or also to both. The layer preferably consists of elastic material or has an elastic material at least at the surfaces, which is favourable for the tensioning of the bushing and the tightness with respect to the pressure medium (13).

In order to pretension the bushing, pressure medium (13), for example a (hydraulic) fluid or a gas, is forced through the pressure hole (12) and then distributed over the channels/cavities of the bypass space (10) around the perimeter of the bushing and flows through the openings (25) or slots (3) in the plates into the elastic displacement space (9). The latter is expanded and sealed by the fluid, so that the elastomer previously present therein is displaced and the entire elastomer layer (4) is thus pretensioned, with the outer plate (8) being forced outward and the inner plate (7) being forced inward. Homogeneous pretensioning of the bushing (1) thus occurs. At the same time, elastomer is forced into the hole for the lubricant passage (2). The diameter of the hole (2) is designed in such a way that, in spite of the bottleneck (19) formed, an adequate cross section for the lubricant flow (18) is maintained.

The cavity (9) forms, as already mentioned, due to the fact that there is no connection between the elastomer (4) and the inside wall (7) in this region. In the unfilled state, the elastomer is only in contact in this region. As soon as the pressure medium (13) is introduced with corresponding pressure, the elastomer (4) lifts off the plate or wall and the cavity formed is filled with the fluid.

The pressure fluid (13) can be a liquid, such as, for example, water or water/glycol mixtures, or a hydraulic oil or gas. In order not to have to guarantee tightness in the long-term, it is also possible to use a hardening fluid which remains in the solid state after hardening and thus ensures constant pretensioning.

In order to compensate for the non-uniformity of the stiffness at the perimeter arising due to the lubricant (oil) hole (2), the elastomer around region (24) projects in the direction of the axle in the non-tensioned state, so that an increase in pressure takes place in this region due to the higher pretensioning.

The invention relates to a component which is suitable for elastic bearing between a shaft or axle and a ring surrounding the shaft. In a further embodiment of the invention, the surrounding ring is the inner ring of one or more roller bearings.

Figure 4:
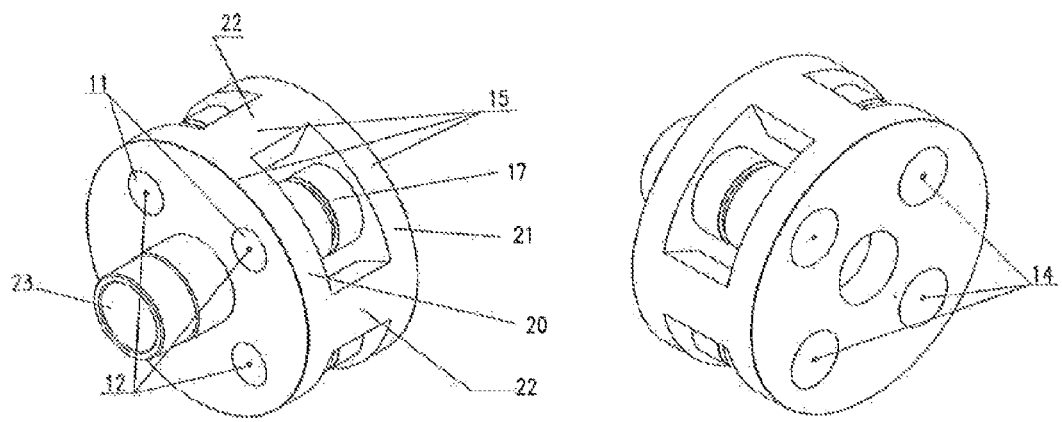

In a further embodiment (FIG. 4), the surrounding ring is the inner ring of a planet carrier with axle (11) and planetary bearing (17). The smaller diameter of the axle points in the direction of the input shaft (23). It is thus possible to insert the axle together with the bushing (as depiction in FIG. 1) from the opposite side into the planet carrier and through the roller bearings (17) the planet gearwheels (16). The elastomer layer is subsequently expanded in accordance with the system described above, and the elastic connection between axle and planetary bearing is thus established.

Figure 5:
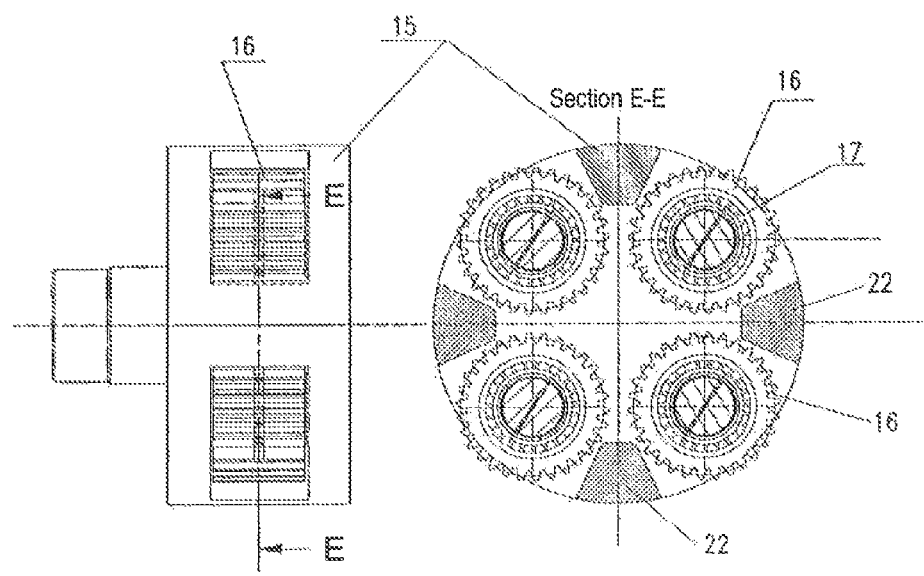
Figure 6:
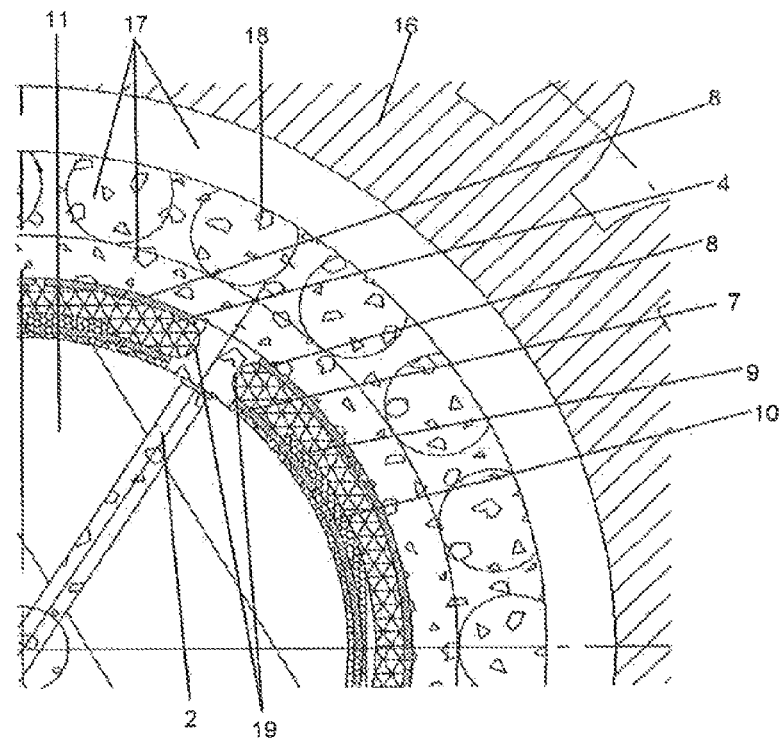
Figure 7:
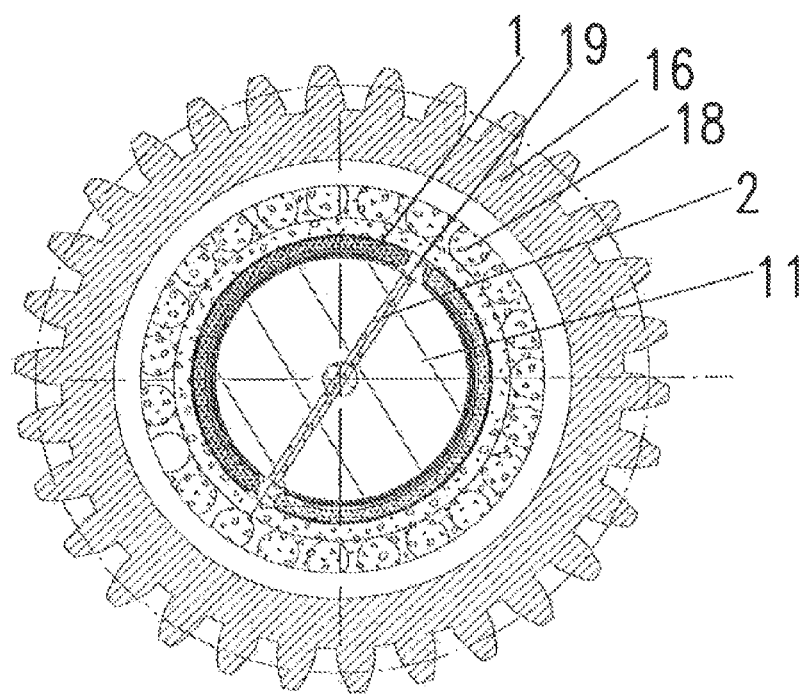

FIG. 5 depicts the planet carrier together with axle, bushing, planetary bearing and planet gearwheels. FIG. 6 shows a planet gear; the section FIG. 7 shows the corresponding details.

The bushings according to the invention can be employed in machine construction for all shaft-hub connections which preferably transmit no or only small moments, thus, for example, moment bearings arranged one behind the other. In this arrangement, one of two bearings transmits the axial forces, while the second bearing (loose bearing) only transmits radial forces and at the same time compensates for flexing of the shaft. Such elements are used equally, in particular, in wind turbines with gearbox and without gearbox.

Comparable use for the bushings according to the invention are throughout machine construction, such as, for example, shipbuilding, mill construction, the rail sector and in the motor vehicles sector.

Figure 3:
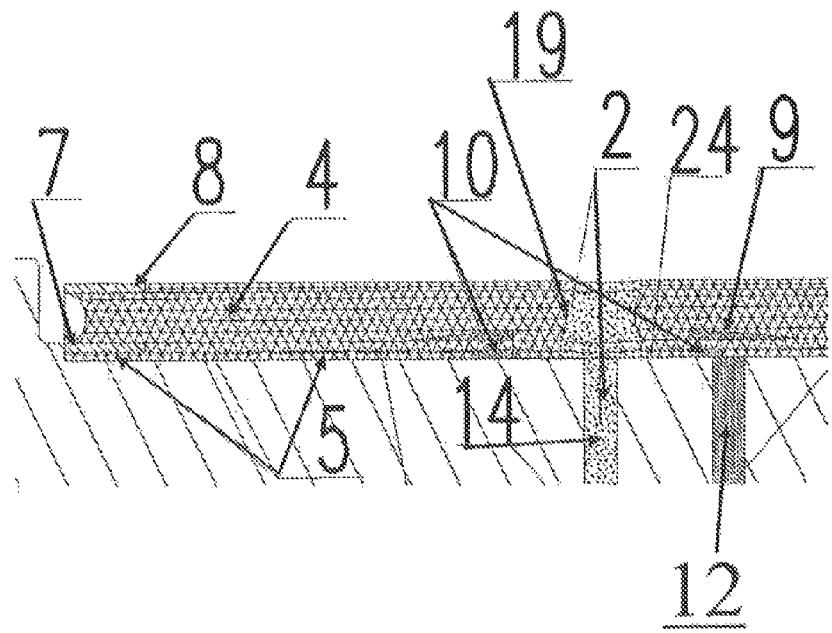
Figure 8:
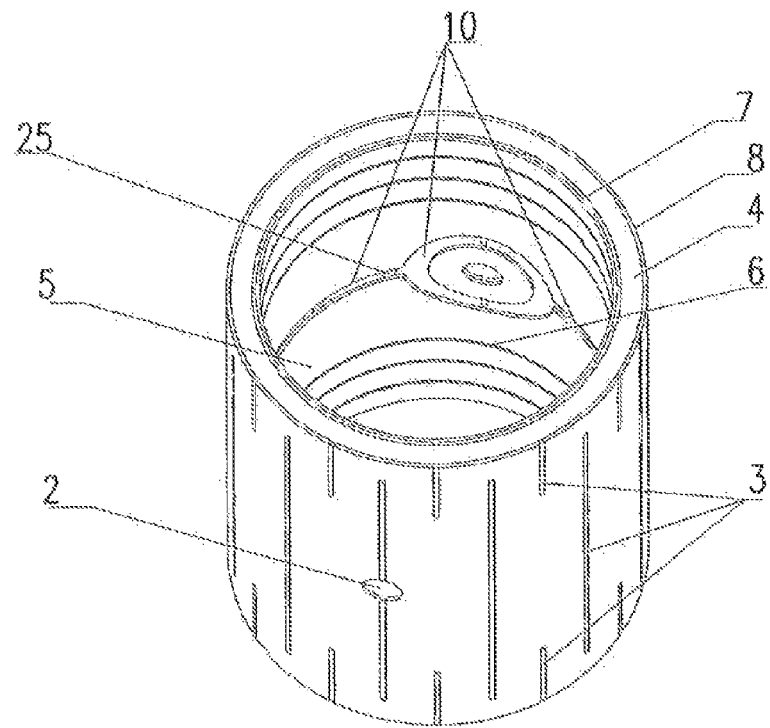
Figure 9:
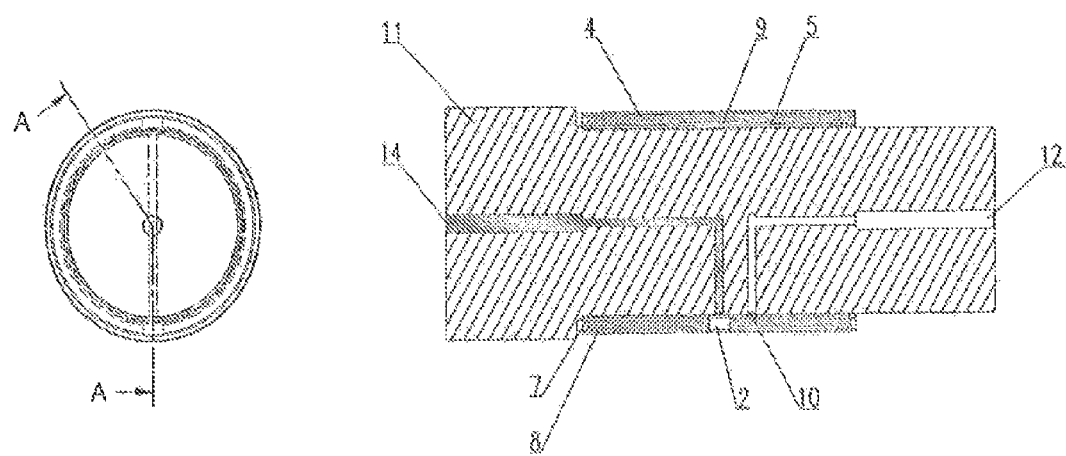
Figure 10:
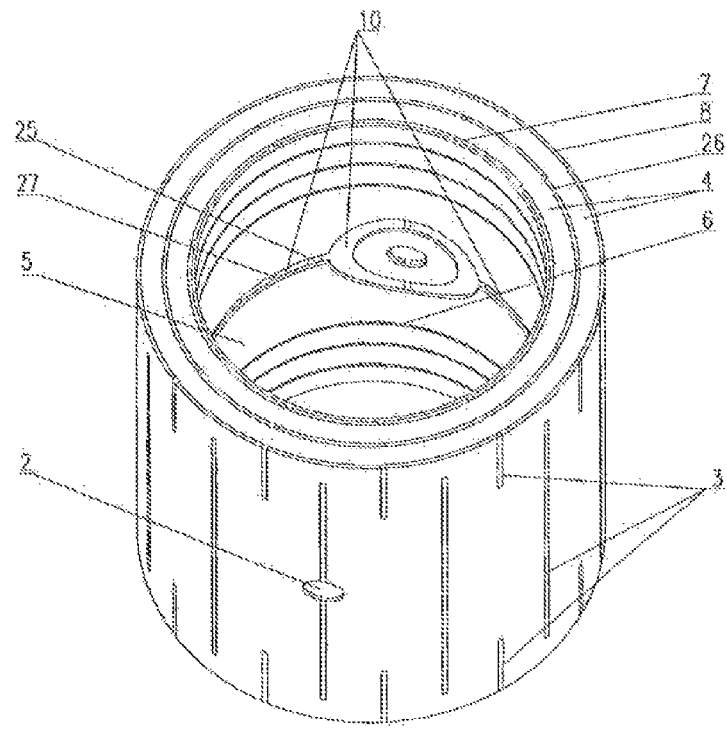
Figure 11:
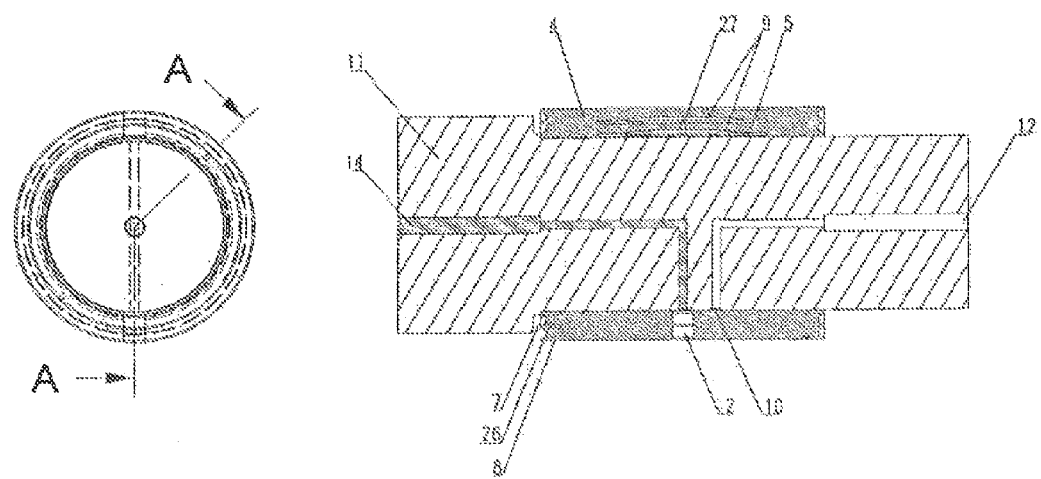
Figure 12:
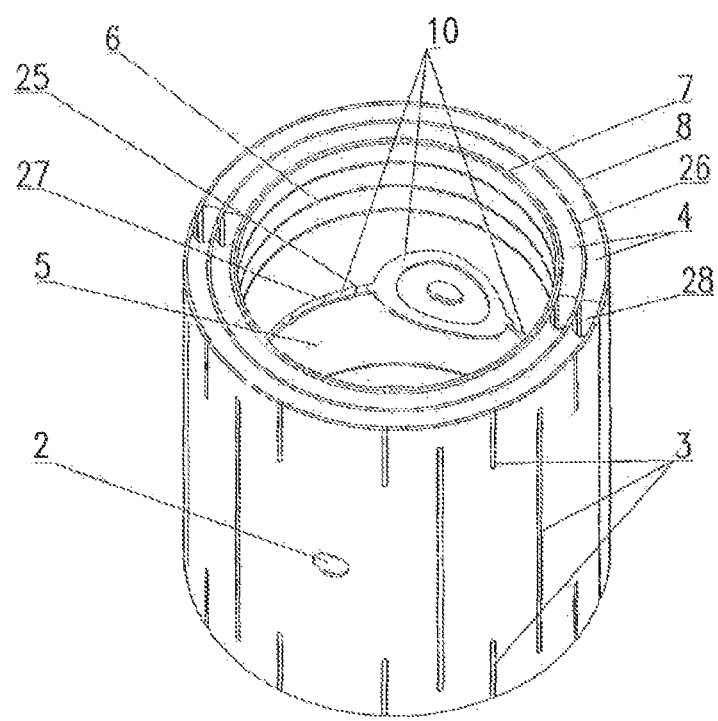
Figure 13:
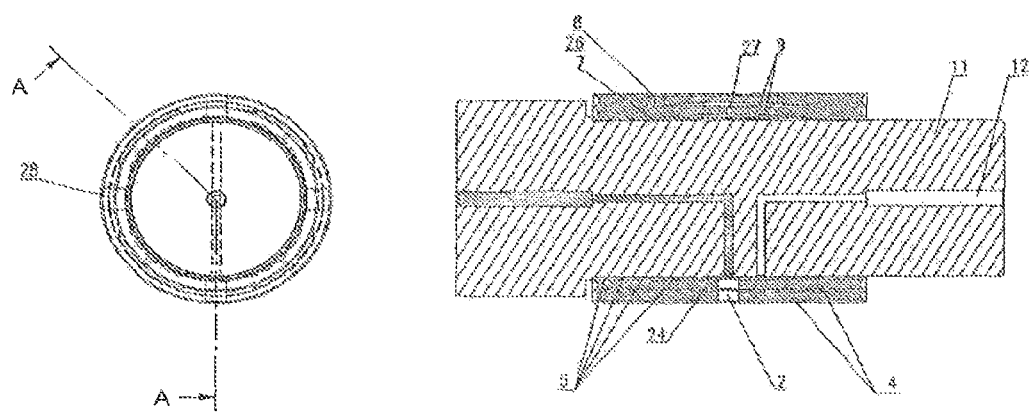

The reference numerals used in the text and in the drawings are explained briefly below:
1. Bushing/bushing body
2. Hole for oil passage
3. Expansion cut-outs in the plate
4. Elastic layer
5. Support/spacer sleeve between bushing and axle
6. Support grooves
7. Inner plate/inside wall/inner cylinder/inner wall body
8. Outer plate/outside wall/outer cylinder/outer wall body
9. Elastic displacement space
10. Bypass space (cavities/channels)
11. Axle/shaft
12. Pressure hole in axle/line for pressure medium
13. Pressure fluid/pressure medium
14. Lubricant hole in axle/line for lubricant
15. Planet carrier
16. Planet gearwheels
17. Planetary bearing
18. Lubricant (oil)
19. Bottleneck/hole in elastomer for lubricant passage
20. Planet carrier front disc (load input)
21. Planet carrier rear disc (follows the front disc in the case of rotational moment)
22. Butterfly (connection between items 20 and 21)
23. Input shaft connection
24. Sealing region around lubricant hole
25. Connection between displacement space and bypass space
26. Central plate
27. Connecting hole between two elastomer displacement spaces
28. Window Figures are explained briefly below:
FIG. 1 Bushing with axle, (three-dimensional three-quarter section)
FIG. 2 Bushing with axle, (three-quarter section side view)
FIG. 3 Bushing with axle, detail view
FIG. 4 Planet carrier, three-dimensional (planet gearwheels not depicted)
FIG. 5 Planet carrier with planet gears, shown on right in section
FIG. 6 Planet gear in section
FIG. 7 Planet gear, detail view
FIG. 8 Bushing; single-layered without windows
FIG. 9 Detail section of bushing; single-layered without windows
FIG. 10 Bushing; multilayered without windows
FIG. 11 Detail section of bushing; multilayered without windows
FIG. 12 Bushing; multilayered with windows
FIG. 13 Detail section of bushing; multilayered with windows

The invention claimed is:

1. A pretensionable elastic cylindrical bushing, through an eye of which a shaft or axle (11), for absorption of vibrations of a wheel bearing or a planetary bearing (17), is intended to pass, the pretensionable elastic cylindrical bushing comprising:
   (I) an outer cylinder (8) and an inner cylinder (7) which are connected to one another by an elastic layer (4) and form, with the elastic layer (4), a bushing body (1),
   (ii) axial slots (3) being distributed over a surfaces and arranged, in a longitudinal direction, in at least one of the outer and the inner cylinders,
   (iii) at least one displacement space (9), which can be expanded by pressure, in a space between the inner and the outer cylinders, which is formed by the elastic layer (4) having slot-like pockets inside the elastic layer, and only having loose contact with and not being connected to a corresponding wall of the inner and/or outer cylinders (7) or (8), and
   (iv) at least one bypass space (10) being formed by a separation maintained between the inner cylinder (7) and the shaft or axle (11) for passing through the eye of the pretensionable elastic cylindrical bushing, where the bypass space (10) outside the bushing body is connected to the displacement space (9) inside the bushing body via at least one connecting opening (25) in the wall of the inner cylinder (7) of the bushing body and being supplied, by at least one line (12), with a pressure medium (13) which is pressed from of the bypass space into the into the displacement space (9) so that the elastic layer (4) is compressed and the bushing is expanded over its entire perimeter due to the slots (3) so as to generate uniform rotationally symmetrical pretensioning of the bushing.

2. The pretensionable elastic cylindrical bushing according to claim 1, wherein the at least one bypass space (10) is formed by a rigid or elastic separating or spacer sleeve (5) which has cut-outs, channels or cavities connected to the at least one displacement space (9) for accommodation of the pressure medium (13), and the at least one bypass space (10) is located between the inner cylinder (7) of the bushing and the shaft or axle (11) passing therethrough with a close fit.

3. The pretensionable elastic cylindrical bushing according to claim 2, wherein the spacer sleeve (5) is an integral with the bushing body (1).

4. The pretensionable elastic cylindrical bushing according to claim 3, wherein the pretensionable elastic cylindrical bushing incorporates the shaft or the axle (11), and the separating sleeve (5) is integral with the shaft or the axle (11).

5. The pretensionable elastic cylindrical bushing according to claim 1, wherein two or more bypass spaces (10) are connected to one another by one or more annular channels (27).

6. The pretensionable elastic cylindrical bushing according to claim 1, wherein the at least one connecting opening (25) is functionally replaced by one or more of the said slots (3).

7. The pretensionable elastic bushing according to claim 1, wherein the at least one line (12) is an axial hole in the shaft or the axle (11) which has at least one substantially radial branch which terminates as an opening in an inside wall of the inner cylinder (7).

8. The pretensionable elastic cylindrical bushing according to claim 7, wherein the at least one line (12) is a sleeve which is located in corresponding holes with an accurate fit and conveys the pressure medium (13).

9. The pretensionable elastic cylindrical bushing according to claim 1, wherein the pretensionable elastic cylindrical bushing has at least one hole (19) which runs transversely through the two wall bodies (7, 8) and has a task of supplying the wheel bearings or the planetary bearings, arranged outside the pretensionable elastic cylindrical bushing, with lubricant (18) supplied via at least one supply line or hole (14).

10. The pretensionable elastic cylindrical bushing according to claim 9, wherein at least one of:
    the at least one supply line or hole (19), and
    the at least one supply line or hole (14) have a sleeve with an accurate fit through which the lubricant is conveyed.

11. The pretensionable elastic cylindrical bushing according to claim 1, wherein the pretensionable elastic cylindrical bushing has one or more completely or partly continuous cylindrical central plates (26) so that the bushing (1) has, in total, at least two elastic layers (4).

12. The pretensionable elastic cylindrical bushing according to claim 11, wherein at least two of the elastic layers (4) have at least one displacement space (9).

13. A planetary bearing comprising a planet carrier (15, 20, 21, 22) and a planet gearwheel crown (16), comprising at least one elastic bushing pretensionable elastic cylindrical bushing, through an eye of which a shaft or axle (11), for absorption of vibrations of a wheel bearing or a planetary bearing (17), is intended to pass, the pretensionable elastic cylindrical bushing comprising:
    (i) an outer cylinder (8) and an inner cylinder (7) which are connected to one another by an elastic layer (4) and form, with the elastic layer (4), a bushing body (1),
    (ii) axial slots (3) being distributed over a surfaces and arranged, in a longitudinal direction, in at least one of the outer and the inner cylinders,
    (iii) at least one displacement space (9), which can be expanded by pressure, in a space between the inner and the outer cylinders, which is formed by the elastic layer (4) having slot-like pockets inside the elastic layer, and only having loose contact with and not being connected to a corresponding wall of the inner and/or outer cylinders (7) or (8), and
    (iv) at least one bypass space (10) being formed by a separation maintained between the inner cylinder (7) and the shaft or axle (11) for passing through the eye of the pretensionable elastic cylindrical bushing, where the bypass space (10) outside the bushing body is connected to the displacement space (9) inside the bushing body via at least one connecting opening (25) in the wall of the inner cylinder (7) of the bushing body and being supplied, by at least one line (12), with a pressure medium (13) which is pressed from of the bypass space into the into the displacement space (9) so that the elastic layer (4) is compressed and the bushing is expanded over its entire perimeter due to the slots (3) so as to generate uniform rotationally symmetrical pretensioning of the bushing.

14. A planetary gearbox, comprising at least one planetary bearing according to claim 13.

15. Use of an elastic bushing, a planetary bearing or a planetary gearbox according to claim 1 in machines and installations which have shaft-hub connections and transmit no or only low moments.

16. The use of an elastic bushing, a planetary bearing or a planetary gearbox according to claim 15 in installations having moment bearings arranged one behind the other.

17. The use of an elastic bushing, a planetary bearing or a planetary gearbox according to claim 15 in wind turbines.

18. A wind turbine comprising at least one elastic bushing, planetary bearing or planetary gearbox, and the at least one elastic bushing, planetary bearing or a planetary gearbox comprising a pretensionable elastic cylindrical bushing, through an eye of which a shaft or axle (11), for absorption of vibrations of a wheel bearing or a planetary bearing (17), is intended to pass, the pretensionable elastic cylindrical bushing comprising:

(I) an outer cylinder (8) and an inner cylinder (7) which are connected to one another by an elastic layer (4) and form, with the elastic layer (4), a bushing body (1), (ii) axial slots (3) being distributed over a surfaces and arranged, in a longitudinal direction, in at least one of the outer and the inner cylinders, (iii) at least one displacement space (9), which can be expanded by pressure, in a space between the inner and the outer cylinders, which is formed by the elastic layer (4) having slot-like pockets inside the elastic layer, and only having loose contact with and not being connected to a corresponding wall of the inner and/or outer cylinders (7) or (8), and (iv) at least one bypass space (10) being formed by a separation maintained between the inner cylinder (7) and the shaft or axle (11) for passing through the eye of the pretensionable elastic cylindrical bushing, where the bypass space (10) outside the bushing body is connected to the displacement space (9) inside the bushing body via at least one connecting opening (25) in the wall of the inner cylinder (7) of the bushing body and being supplied, by at least one line (12), with a pressure medium (13) which is pressed from of the bypass space into the into the displacement space (9) so that the elastic layer (4) is compressed and the bushing is expanded over its entire perimeter due to the slots (3) so as to generate uniform rotationally symmetrical pretensioning of the bushing.

* * * * *